J. W. BROWER.
Smut Machine.
No. 3,455.
Patented Feb. 28, 1844.
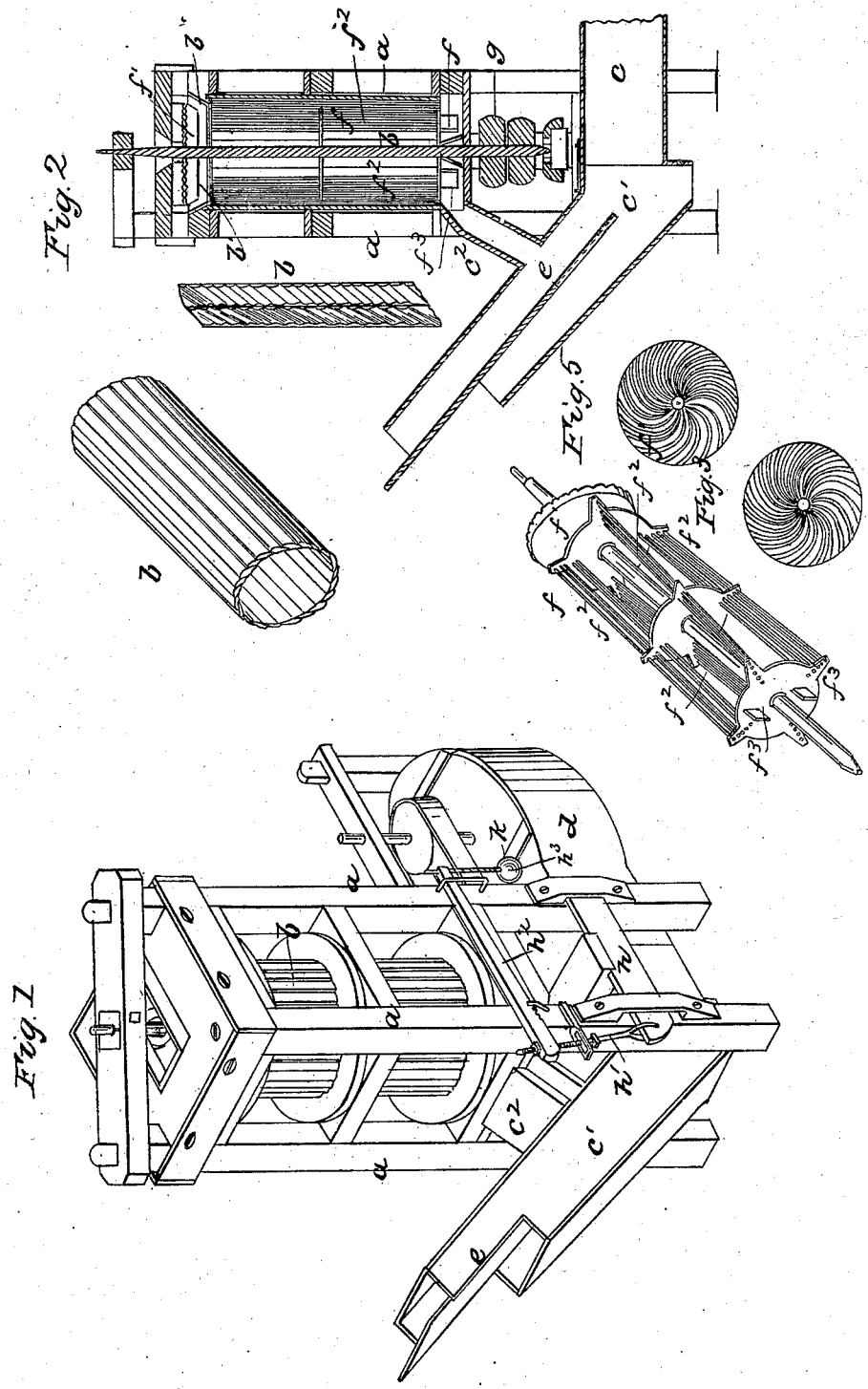

UNITED STATES PATENT OFFICE.

JACOB W. BROWER, OF MOUNT AIRY, NORTH CAROLINA.

SMUT-MACHINE.

Specification of Letters Patent No. 3,455, dated February 28, 1844.

*To all whom it may concern:*

Be it known that I, JACOB W. BROWER, of Mount Airy, in the county of Surry and State of North Carolina, have invented a new and useful Improvement in Smut-Machines for Cleaning Wheat, &c.; and I do hereby declare that the following is a full, clear, and exact description thereof, reference being had to the accompanying drawing, which forms a part of this specification, in which—

Figure 1, is a perspective view. Fig. 2, section and plan of concave. Fig. 3, upper and lower rubbers. Fig. 5 cylinder detached.

The nature of my invention consists in the manner of constructing the concave and the apparatus for separating the wheat from chaff, &c.

In its construction a frame ($a$) is made, of four upright posts connected by cross ties, which support an upright cylinder a concave ($b$,) and also the bridge-tree and box in which the spindle of a runner or cylinder-beater runs; below the bridge-tree above named, there is a spout ($c$) leading from a common horizontal fan ($d$), which rises, after passing the frame, at an angle ($c'$) of about 35°; into this inclined spout a partition ($e$) is inserted, that divides it into an upper and lower tube; about two feet of the lower part of this partition is made of coarse wire gauze, and is for the purpose of spreading the grain only, without screening it; the grain is led into this spout from the machine just above the upper end of the wire gauze, by a spout ($c^2$) which connects them.

The runner or beating cylinder ($f$) is composed of a shaft, or spindle on which are several disks, the upper one of which ($f'$) is thick and grooved in channels on the upper side, somewhat similar to a mill stone, but the channels are so formed as to tend to force out the grain, near the center where it enters toward the periphery till they reach the center of the semidiameter, the grooves thence gradually curve forward so that they have a tendency to retard the outward movement of the grain till it is sufficiently rubbed, between the disk just described and another on the under side of the cover of the concave, somewhat similar in its construction; below the disk ($f'$) is another made therein and of smaller diameter, from which four arms project; and two or more similar disks are placed below it; a row of holes is made radially along each of the arms and bars ($f^2$) are put through them, extending from the upper to the lower one somewhat angularly; under the bottom disk are two wings or vanes ($f^3$) for throwing the grain out toward the periphery to aid in delivering it from the spout; below the bottom of the case two pulleys ($g$) are affixed to the shaft, by one of which it is driven; the other is connected with the fan and drives that; the lower end of the shaft is stepped into the bridge-tree, one end of which rests on a stationary cross piece of the frame the other rests on the middle of a horizontal lever ($h$) one end of which is jointed to the frame the other is suspended by a rod ($h'$) to the end of a lever ($h^2$) above and parallel with lever ($h$) the fulcrum of ($h^2$) is in the post of the frame and to its long arm a weight ($h^3$) is suspended by this apparatus; the running cylinder is held up with a force proportional to the weight suspended on lever ($h^2$) and bearing the disk ($f'$) up sufficiently to rub the wheat between it and the one above, but if any hard substance, such as stones or iron get into it, the runner is caused to descend and relieve the mill without breaking.

The upper part of the concave is enlarged to give room to the rubbers ($f'$) below which there is a funnel ($b'$) that turns the grain inward after it falls below the rubbers; below this funnel the concave is formed of straight parallel staves ($b$) made plain on the outside, and armed on the inside with diagonal triangular ribs or projections, so constructed as to have the grain strike their flat upper surface from which to rebound; these staves overlap each other, so that the openings between them will be a tangent to the circle, and the square edges of the staves which project inside will be presented for the grain to strike against, while the smut, &c., finds a free egress through the tangential openings between the staves. The bottom of the concave has a spout ($c^2$) leading into the fan spout as before named.

The grain enters from above at the center, and passes out toward the outside of the case between the upper disk ($f'$) and cover \ of the concave where it is rubbed; from thence it falls down and is beaten by the rods on the runner against the projections on the concave; the dirt being driven out through the tangential openings therein; from the concave it falls through the spout ($c^2$) and is submitted to the action of the fan as above named.

What I claim as my invention, and desire to secure by Letters Patent is—

1. The runner having an upper disk which is furrowed on its upper face as above described.

2. I also claim the double spout fan in combination with the above machine as herein described.

J. W. BROWER.

Witnesses:
James Young,
J. J. Greenough.